United States Patent [19]

Johnson

[11] 4,238,961
[45] Dec. 16, 1980

[54] APPARATUS FOR USE IN BALANCING BUS AND TRUCK WHEELS

[76] Inventor: James A. Johnson, 59 Ocean House Rd., Cape Elizabeth, Me. 04107

[21] Appl. No.: 82,879

[22] Filed: Oct. 9, 1979

[51] Int. Cl.³ ..................... G01M 1/04; G01M 1/12
[52] U.S. Cl. ......................................... 73/480; 73/487
[58] Field of Search ................. 73/480, 481, 485, 487; 144/299 A

[56] References Cited

U.S. PATENT DOCUMENTS

| 3,177,725 | 4/1965 | Johnson | 73/480 |
| 3,236,105 | 2/1966 | Hamer | 73/481 |
| 3,352,732 | 11/1967 | Darr | 73/480 X |
| 3,824,862 | 7/1974 | Branick | 73/480 |

Primary Examiner—James J. Gill

[57] ABSTRACT

Apparatus for use in balancing a truck or bus wheel includes an assembly for axially securing such a wheel on a shaft and a stand to rotatably support the wheel-holding assembly while the wheel is being balanced. The stand has spaced shaft supporting members rearwardly and downwardly inclined and provided with stops spaced rearwardly of the front of the stand and hooks that protrude therefrom. The stand has a chamber open at the front and between the members which is of a depth and length greater than the radius of the wheel. With the stand tipped forwardly to position the hooks to receive the shaft of the assembly and then returned to its stable position, the assembly is lifted and held against the stops.

14 Claims, 4 Drawing Figures

APPARATUS FOR USE IN BALANCING BUS AND TRUCK WHEELS

BACKGROUND REFERENCES

U.S. Pat. No. 3,177,725
U.S. Pat. No. 4,009,612

BACKGROUND OF THE INVENTION

The importance of balancing motor vehicle wheels is well established and is easily and accurately effected when accomplished in accordance with the teachings of U.S. Pats. No. 3,177,728 and No. 4,009,612.

In brief, it is required for balancing purposes in accordance with said patents, that a wheel be incorporated in an assembly axially with respect to an assembly shaft and then held by a stand in a manner ensuring that the wheel is free to rotate, first until its heavy part is downward and finally, after being balanced, to demonstrate that it will remain in any position into which it is manually turned.

Except in the case of such wheels as those of trucks and buses, the weight of automobile wheels is such that each may be manually lifted, when incorporated in the assembly, and placed on the stand.

Truck and bus wheels are too heavy to be thus handled and in addition such wheels consist of heavy tire-supporting rims in contrast to the wheels of other motor vehicles which have relatively small diameter, hub-accommodating holes.

THE PRESENT INVENTION

The general objective of the present invention is to provide apparatus enabling a truck or bus wheel to be balanced in accordance with the previously referred-to patents, an objective attained with a stand having two laterally spaced members for the support of an assembly in which a truck wheel is incorporated axially of a supporting shaft. The members are downwardly and rearwardly inclined from the front of the stand and each has a stop rearwardly thereof and an upwardly disposed hook protruding from the front of the stand which has a wheel-receiving chamber open at the front and upwardly between the members of a length and depth greater than the radius of the wheel.

By tipping such a stand forwardly the hooks are so lowered that they may receive the ends of the shaft with the assembly lifted and seated against the stops when the stand is returned to its stable position.

Another objective of the invention is to enable the devices of U.S. Pat. No. 4,009,612 to be included in the assembly, an objective attained by having the supporting members of channel stock thus providing confining tracks for the devices.

Yet another objective of the invention is to provide a stand construction that is sturdy, relatively light in weight and adapted to meet various wheel size requirements, an objective attained with a stand provided with an upper section connected to a lower section in a manner permitting vertical adjustment thereof for different wheel sizes.

A further objective of the invention is to provide a supporting assembly for use in holding the rims of truck wheels axially relative to the supporting shaft, an objective attained with an assembly having a holder the diameter of which is less than the minimum of a predetermined rim diameter range and slidably supporting three equally spaced radial plungers the outer ends of which are engageable with the interiors of the rims. A shaft-receiving tubular support extending through the holder has a forwardly tapering rear end and a front end on which a nut is threaded to bear against the holder and to draw said conical end portion forwardly to force the plungers outwardly into engagement with the rim and thus secure said holder axially with respect thereto.

Other objectives of the invention will be apparent from the accompanying specification and appended claims.

BRIEF DESCRIPTION OF THE DRAWINGS

The accompanying drawings illustrate a preferred embodiment of the invention

THE PREFERRED EMBODIMENT OF THE INVENTION

A stand in accordance with the invention is generally indicated at 10 and the assembly in which a truck or bus wheel 11 is to be incorporated is generally indicated at 12. Such a wheel, while consisting of only a rim 13, a tire 14, and a lock ring, not shown, is heavy and requires that the assembly by which it is to be rotatably supported by the stand be different than that disclosed in my above referred-to patents.

Figure 1:
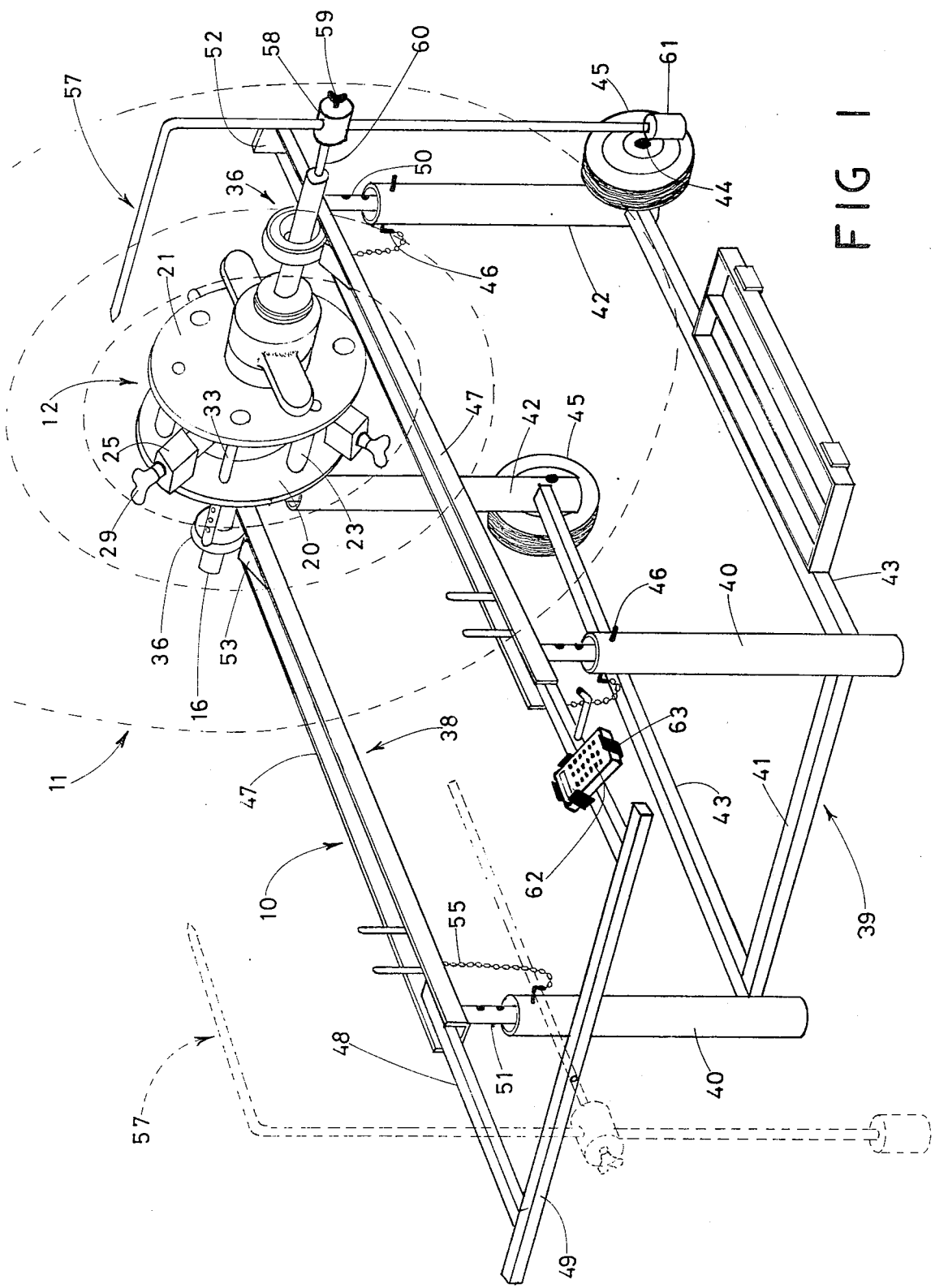
FIG. 1 is a perspective view of the stand and assembly.
Figure 2:
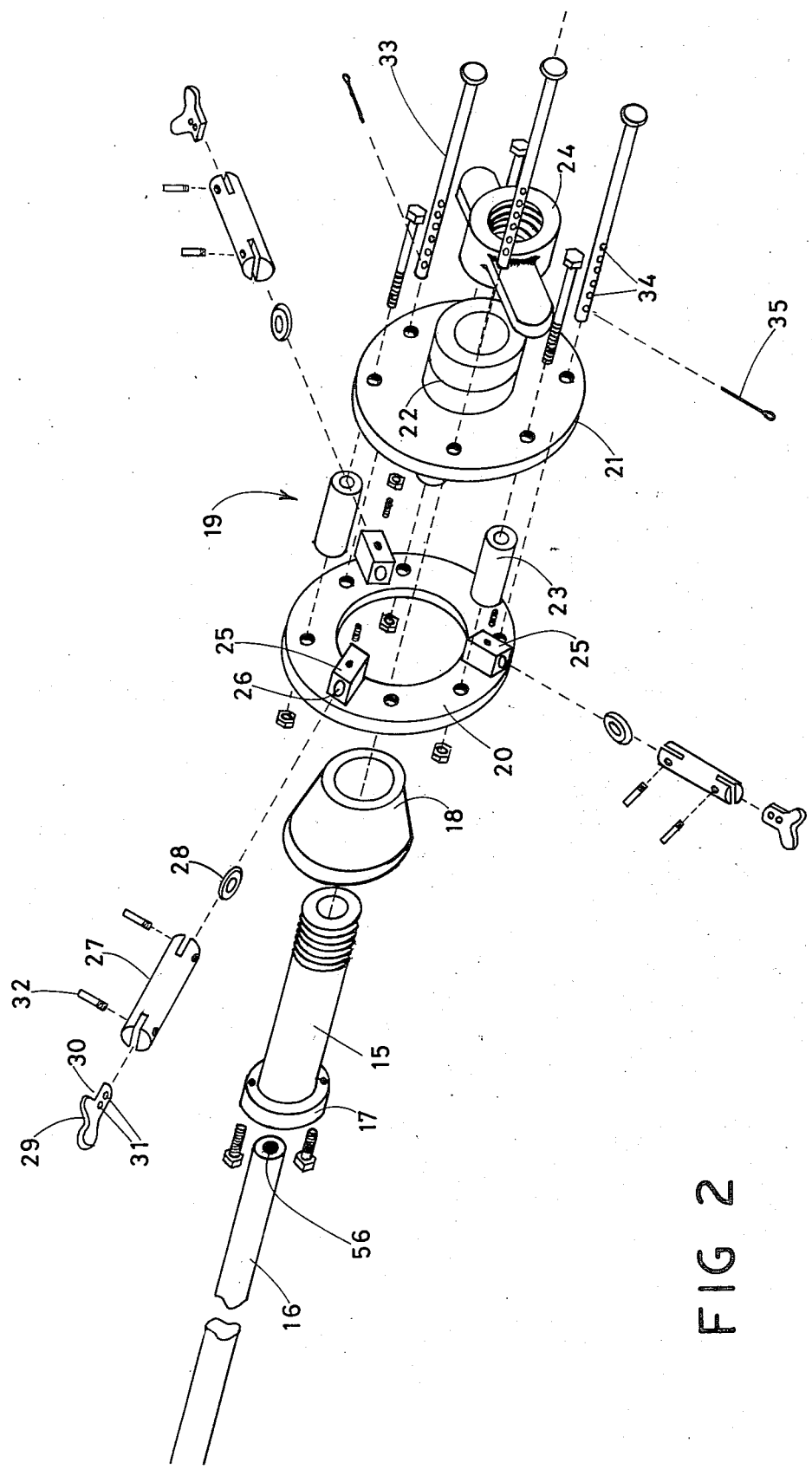
FIG. 2 is an exploded view of the assembly.

The assembly 12, see FIG. 2, includes a tubular support 15 dimensioned to receive a shaft 16 and formed with a head 17 at one end with its other end threaded. A frustro-conical member 18 fitted on the support 15 is attached to the head 17. A holder, generally indicated at 19, has a rear wall 20 in the form of a ring dimensioned to receive the conical member 18 within it, and a front wall 21 provided with a hub 22. The front and rear walls are interconnected by spacers 23 and the hub 22 has an axial bore that is dimensioned to enable the holder to be fitted on the support 15 with the threaded end thereof exposed to receive the clamping nut 24.

The inner face of the rear holder wall has guide blocks 25 secured thereto and spaced 120° apart with each block 25 having a radial bore 26 in slidable support of a plunger 27. Each plunger 27 has a roller 28 held in its forked, inner end in alignment with the axis of the support 15 and a rim engaging member 29 having a shank 30 having two transverse bores spaced lengthwise thereof with either one connectable to the other forked end of a plunger 27 by a pivot 32, the second of the two bores 31 enabling a plunger to be lengthened. Each rim engaging member 29 is in the form of a shallow V and is pivotally supported to ensure that the ends of the V will seat properly against the inner surface of a rim 13 transversely thereof.

In addition, the assembly 12 has a series of long bolts 33 extending lengthwise through the holder walls and spaced 120° apart. Each bolt 33 has a series of transverse bores 34 spaced lengthwise of its unheaded end, each adapted to receive a stop pin 35.

In use, a truck or bus wheel 11 is laid flat and the assembly, minus the shaft 16, is placed therein with the effective length of the bolts 33 adjusted by means of the stop pins to serve as legs supporting the holder in a plane inclusive of the rim 13. The nut 24 is then turned to draw the conical member 18 into the holder until the plungers 27 are forced outwardly to so clamp the member 29 against the rim that the wheel is securely incorporated in the assembly.

The wheel is then erected and the assembly completed by inserting the shaft 16 through the tubular support 15 and then, as is preferred, bearings, generally indicated at 36 are placed on the ends of the shaft 16. The assembly is then ready to be supported by the stand 10. As taught by my Pat. No. 4,009,612, the shaft 16 is of a diameter substantially less than the inside diameter of the inner race 37 of the bearings 36.

The stand 10 is shown as consisting of upper and lower frames indicated generally at 38 and 39, respectively. The lower frame 39 has two rear tubular uprights 40 with their lower ends interconnected by a cross piece 41 and two front tubular uprights 42 with the lower end of each connected to the lower end of the appropriate one of the rear uprights 40 by side members 43. Each of the front uprights 42 has a spindle 44 in support of a wheel 45 and the rear uprights 40 are of sufficient length to serve as legs so that all the uprights are of the same height. At the upper end of each upright, there are transversely aligned holes for removably supporting an anchor pin 46.

The upper frame 38 has two channel members 47 with the two arms 48 of a rearwardly disposed handle 49 welded in the rear ends thereof. Each of the members 47 has front and rear tubular legs 50 and 51, respectively, spaced and dimensioned for entry into the appropriate ones of the uprights of the lower frame 39 and each member 47 is of sufficient length to extend a short distance beyond its front leg with its extremity having an end cap welded thereto and disposed and dimensioned to serve as a hook 52. Each channel member 47 has a stop 53 welded therein in a position rearwardly of its front leg 50, desirably about the same distance therefrom as the distance that the hook 52 protrudes.

Each front leg 50 has a series of vertically spaced and transversely aligned holes 54A and each rear leg 51 has a similar series of holes 54B, each two transversely aligned holes providing a passageway for an anchor pin 46. Each anchor pin 46 is shown as connected to the appropriate channel member 47 by a chain 55. Corresponding selected ones of the passageways of the front and rear leg series are used in connecting the upper and lower frames to provide a wanted stand height that may be quickly and easily varied in relation to wheel sizes as it is always a requirement that the height of the stand 10 be greater than the radius of the wheel to be balanced.

It will be noted that a wanted feature of the stand is that the channel members 47 be slightly inclined downwardly and rearwardly. To that end, corresponding passageways of the rear legs are located slightly, in practice one inch, lower than those of the front legs.

Figure 3:
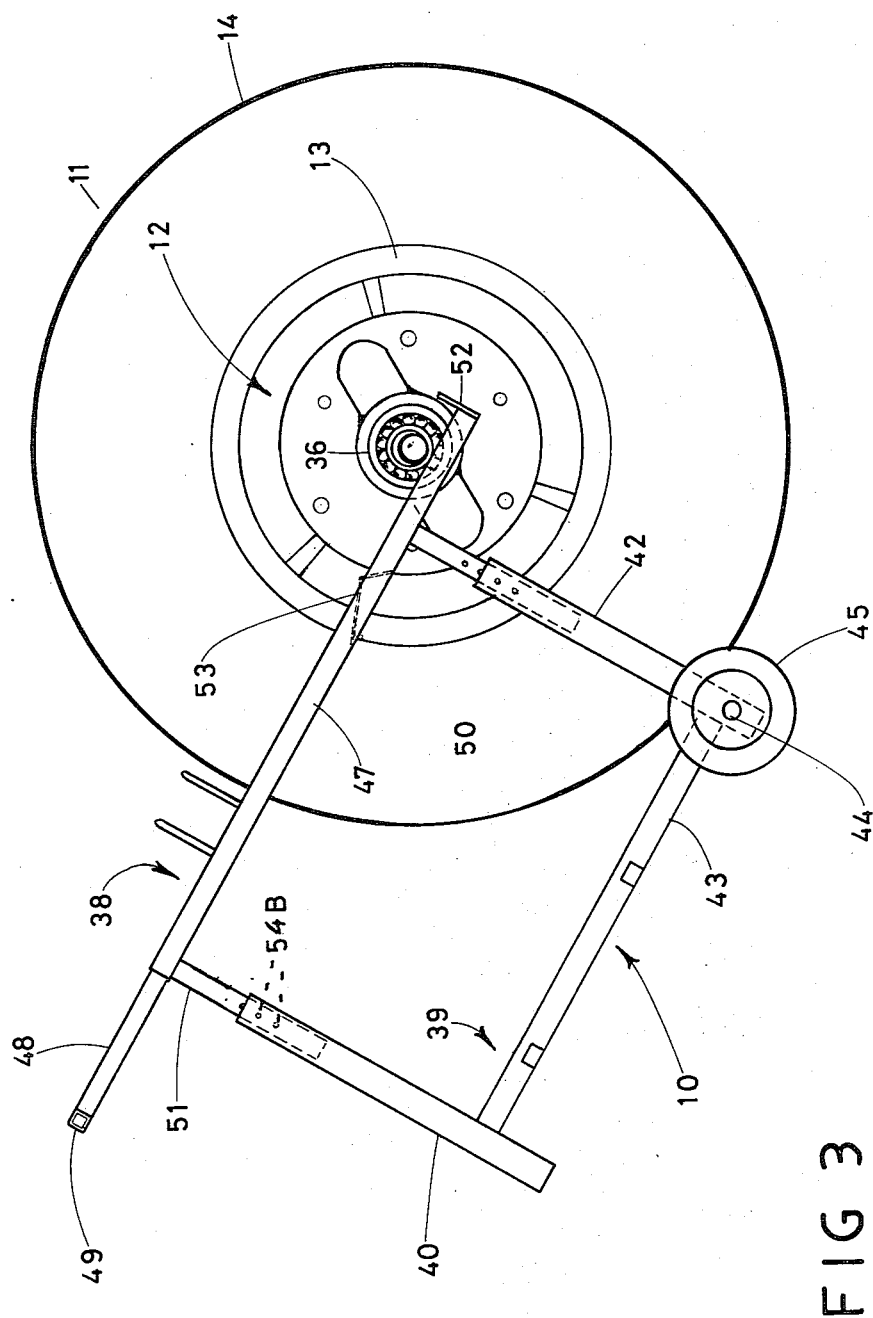
FIG. 3 is a side view of the stand with the stand tipped forwardly to lower its hooks to enable the shaft of the wheel supporting assembly to be caught and lifted thereby as the stand is returned to its stable position.
Figure 4:
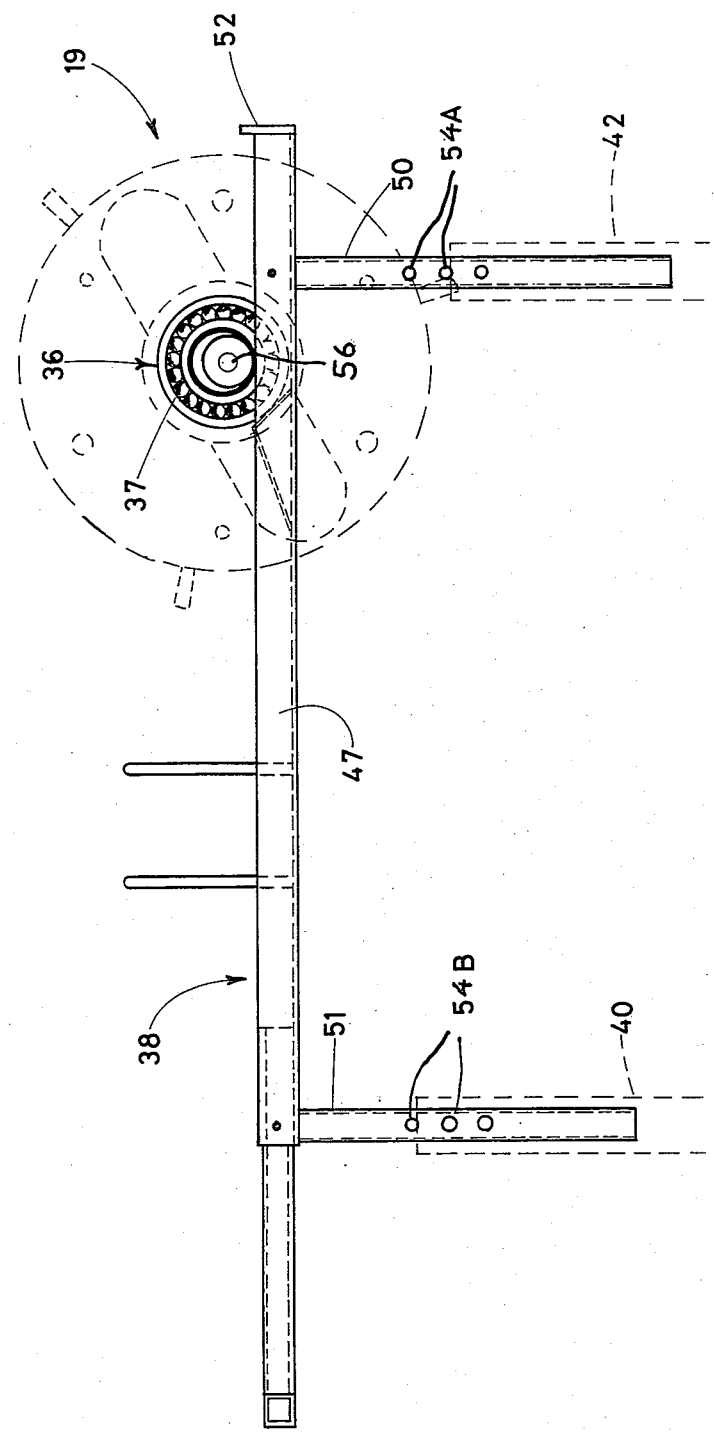
FIG. 4 is a fragmentary side view, showing the assembly positioned on the stand.

With an assembly 12 having a wheel 11 incorporated therein, the stand 10 is tipped forwardly, see FIG. 3, to an extent such that the hook 52 is so lowered that the asembly may be rolled into a position in which the bearings 36 may be picked up by the hooks 52, once the wheel 11 is centered relative to the open end of the stand and the bearings 26 are spaced on the shaft 16 to be thus engaged. When the stand 10 is returned to its stable position, the assembly including the bearings rolls by gravity rearwardly against the stops 53 and is rotatably supported for wheel balancing. It will be appreciated that the length of the stand, which is greater than the radius of the largest wheel to be balanced, affords such substantial mechanical advantage to the user that the stand may be easily returned to its stable position and again tilted forwardly when the wheel has been balanced.

In order that the invention may be fully understood, the procedure followed in wheel balancing is herein summarized.

As the assembly is free to rotate, once it is on the stand, it comes to rest with its heavy part lowermost with the diametrically opposed part, its lightest part. Each end of the shaft 16 has an axial socket 56. A scriber 57 is slidable transversely of a hub 58 and locked thereto by a set screw 59 and the hub 58 has an axial member 60 dimensioned to fit a shaft socket 56. The scriber 57 has a counter weight 61 and the scriber is adjusted relative to the hub 58 in order that the light point of the wheel may be accurately located and marked on the tire.

A hanger, not shown, see the above referred-to patents, is then secured to the rim and with the wheel turned to bring the heavy and light points horizontal, weights are placed on the hanger until the heavy point is balanced as nearly as possible. Such weights are in the form of squares and are provided in different weight values. The weight total so needed is then divided into two equal parts and for convenience in so doing, a calculator 62 is provided stored in a shelf 63. A weight equal to each part is attached to the rim at points spaced 60° on opposite sides of the light point and on the opposite side of the wheel. For this purpose, the scriber 57 is used using the light point as the pivot center and final balancing is attained by adding, if necessary, a weight trimmed as required, to the light point and it will then be found, as a final test, that the wheel when turned into any position will remain stationary.

The stand is then tilted forwardly until the wheel rests on the floor and it is then freed from the assembly.

I claim:

1. In combination a stand for use in balancing a large wheel such as a truck or bus wheel and an assembly in which said wheel is to be incorporated, said assembly including a shaft and means operable to connect said wheel thereto with the shaft axially thereof with the shaft ends protruding, said stand including a pair of laterally spaced wheel supporting members, each member including an upwardly disposed hook at its front end and a stop spaced rearwardly thereof, and stable supporting structure for said members having a wheel receiving chamber open at the front of the stand and upwardly between said members and of a length and depth greater than the radius of said wheel with said supported members rearwardly and downwardly inclined, said hooks extending forwardly from the front of the structure and the stops rearwardly thereof, said stand tiltable forwardly from its stable position to lower said hooks into a position to receive said shaft with the wheel in alignment with the chamber, the length of the structure such that mechanical advantage is afforded the user in returning the stand to its stable position, the wheel then being lifted, the shaft rotatably held against the stops with the wheel free to rotate relative to the stand, said stops spaced rearwardly with respect to the front of the stand to insure the stability thereof while the wheel is being tested for imbalance.

2. The combination of claim 1 in which the assembly includes a ball bearing unit on each end of the shaft to be seated against the appropriate stop.

3. The combination of claim 2 in which the ball bearing units are so dimensioned that the diameter of their inner races is larger than the shaft ends and the wheel supporting members are channels serving as tracks for the bearing units.

4. A stand for use in balancing a large wheel such as a truck or bus wheel when incorporated in an assembly axially of a shaft extending therethrough, said stand including a pair of laterally spaced wheel supporting members, each member including an upwardly disposed hook at its front end and a stop spaced rearwardly thereof, and stable supporting structure for said members having a wheel receiving chamber open at the front of the stand and upwardly between said members and of a length and depth greater than the radius of said wheel with said supported members rearwardly and downwardly inclined, said hooks extending forwardly from the front of the structure and the stops rearwardly thereof, said stand tiltable forwardly from it stable position to lower said hooks into a position to receive said shaft with the wheel in alignment with the chamber, the length of the structure such that mechanical advantage is afforded the user in returning the stand to its stable position, the wheel then being lifted and the shaft rotatably held against the stops with the wheel free to rotate relative to the stand, said stops spaced rearwardly with respect to the front of the stand to insure the stability thereof while the wheel is being tested for imbalance.

5. The stand of claim 4 in which the length of the chamber is such that wheels within a predetermined radius range can be accommodated therein when incorporated in an assembly, and means operable to adjust the height of the stand to vary the depth of the chamber as required by the radius of the wheel to be balanced.

6. The stand of claim 4 in which there are upper and lower frames, the lower frame includes a rear pair of interconnected uprights, the upper section includes two side members and a handle connected to the rear ends thereof, each side member provided with front and rear legs, and means adjustably connecting each leg to the appropriate one of the uprights in a manner enabling the height of the upper frame to be varied relative thereto.

7. The stand of claim 6 in which the uprights are tubular and the legs of the upper frame are dimensioned to enter the uprights, and the adjustable connecting means include a transverse passageway adjacent the upper end of each leg, a vertical and uniformly spaced series of transverse passageways extending through each leg, and a connecting pin for each upright and extending through the passageway thereof and the appropriate one of the leg passageways that provides the wanted stand height with the side members rearwardly and downwardly inclined.

8. The stand of claim 1 in which the side members of the upper frame are channels, the stops are located therein and a member closing the front end of each channel and extending upwardly therefrom to establish a hook.

9. The stand of claim 4 in which each supporting member, at least between its stop and hook is a channel.

10. An assembly in which a truck or bus wheel comprising a rim is to be so incorporated that it may be rotatably supported by a stand with a tire mounted thereon, said rim within a predetermined diameter range, said assembly including a holder the diameter of which is less than the minimum of said range, three equally spaced, radial plungers slidably carried by said holder, the outer end portion of each plunger engageable with the interior of the rim, the inner ends of said plungers provided with rollers, a shaft-receiving tubular support extending through said holder and having a forwardly tapering rear end portion for engagement with said rollers and a threaded front end, and a nut threaded on said front end engageable with said holder and operable to draw said conical portion forwardly and force said plungers outwardly into engagement with said rim and thus secure said holder axially with respect thereto and a shaft dimensioned to be a slidable fit and extend through said tubular support with supporting end portions exposed.

11. The assembly of claim 10 in which the holder is to be inserted, front end up, inside the truck rim with the wheel laid flat and the assembly complete except for its shaft, and the holder includes a series of arcuately spaced bolts extending slidably therethrough from said front end, said bolts longer than the axial extent of the holder, and stop means attached to the bolts for engagement with the back end of the holder and adjustable to function as legs so positioning the holder that the outer end portions of the plungers will properly engage the rim.

12. The assembly of claim 11 in which the outer end portion of each plunger is a separate member including two arms establishing a shallow V and a shank having at least one transverse bore, the plunger has a fork receptive of the shank and a pivot pin extending through the fork and the hole in the shank pivotally supporting the member with the shallow V positioned for transverse engagement with the inner surface of the rim and to swing in that direction.

13. The assembly of claim 12 in which the pivot pin is removable and the shank has a second hole spaced lengthwise of the shank from the first named hole to receive the pin to enable the overall length of the plunger to be extended.

14. The assembly of claim 10 in which the holder includes front and rear walls interconnected in axially spaced relationship, the rear wall is annular with its inside diameter greater than the outside diameter of the tapered end portion of the support, the plungers are slidably connected to the rear wall, and the front wall includes an outwardly disposed hub engageable by the nut and providing an axial passageway for the front end of the tubular member.

* * * * *